United States Patent
McGettigan et al.

(10) Patent No.: US 6,827,450 B1
(45) Date of Patent: Dec. 7, 2004

(54) SCROLLING COLOR PROJECTION SYSTEM

(75) Inventors: Anthony D. McGettigan, Santa Rosa, CA (US); Markus Duelli, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/262,539

(22) Filed: Oct. 1, 2002

Related U.S. Application Data

(60) Provisional application No. 60/327,607, filed on Oct. 5, 2001, and provisional application No. 60/327,608, filed on Oct. 5, 2001.

(51) Int. Cl.[7] .................. G03B 21/00; G03B 21/28; G02F 1/1335; G02B 26/08
(52) U.S. Cl. .................. 353/31; 353/33; 353/81; 349/9; 359/211; 359/226
(58) Field of Search .................. 353/31, 33, 81; 349/5, 7–9; 359/211, 226

(56) References Cited

U.S. PATENT DOCUMENTS

| | | | |
|---|---|---|---|
| 5,398,082 A | | 3/1995 | Henderson et al. ......... 348/781 |
| 5,548,347 A | | 8/1996 | Melnik et al. .............. 348/761 |
| 5,634,704 A | * | 6/1997 | Shikama et al. ............. 353/31 |
| 5,748,376 A | | 5/1998 | Lin et al. .................... 359/629 |
| 5,909,204 A | | 6/1999 | Gale et al. .................... 345/85 |
| 6,334,685 B1 | * | 1/2002 | Slobodin ...................... 353/31 |
| 6,375,330 B1 | * | 4/2002 | Mihalakis .................... 353/31 |
| 6,587,159 B1 | * | 7/2003 | Dewald ........................ 348/744 |
| 6,739,723 B1 | * | 5/2004 | Haven et al. ................. 353/20 |
| 2001/0008470 A1 | * | 7/2001 | Dewald ....................... 359/850 |
| 2002/0135856 A1 | * | 9/2002 | Penn ........................... 359/290 |
| 2002/0135874 A1 | | 9/2002 | Li ................................ 359/497 |
| 2003/0020839 A1 | * | 1/2003 | Dewald ....................... 348/743 |

FOREIGN PATENT DOCUMENTS

JP  11-231261  8/1999

OTHER PUBLICATIONS

D. Scott Dewald et al., *Sequential Color Recapture and Dynamic Filtering: A Method of Scrolling Color*, SID 01 Digest, v.32, pp. 1076–1079 (2001).

* cited by examiner

*Primary Examiner*—David Gray
*Assistant Examiner*—Magda Cruz
(74) *Attorney, Agent, or Firm*—Allen, Dyer, Doppelt, Milbrath & Gilchrist, P.A.

(57) ABSTRACT

A integrating light pipe re-circulates color to improve efficiency. A number of color filters, such as blue, green, and red filters, on the end of the light pipe transmit a selected color and reflect the remaining light back into the light pipe, where it is spatially homogenized and re-circulated back to the output of the light pipe. The re-circulated homogenized light illuminates the filters, and the process repeats. Thus, most of the light from the light source eventually is transmitted through one of the color filters. The filters can provide straight boundaries between the resultant color beams, which are provided to a scrolling element, such as a rotating prism, rotating mirror drum, or linear oscillating optical element, and hence to a light valve. The combination of the re-circulating light pipe and scrolling element provide continuous color scrolling and efficient use of the broad-spectrum light from the light source.

28 Claims, 5 Drawing Sheets

SCROLLING COLOR PROJECTION SYSTEM

CROSS-REFERENCE TO RELATED APPLICATIONS

This patent application claims priority from commonly owned U.S. Provisional Patent Application No. 60/327,607 entitled RECIRCULATING LIGHT PIPE, filed Oct. 5, 2001 by Anthony D. McGettigan, Markus Duelli, and Edward S. Sherman; and from U.S. Provisional Patent Application No. 60/327,608 entitled POLARIZING LIGHT PIPE filed Oct. 5, 2001 by Anthony D. McGettigan, Clark Pentico, Markus Duelli, and Edward S. Sherman, the disclosures of which are hereby incorporated in their entirety for all purposes.

This patent application is being concurrently filed with U.S. patent application Ser. No. 10/262,520, entitled POLARIZING LIGHT PIPE by Anthony D. McGettigan, Clark Pentico, Markus Duelli, and Edward S. Sherman, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

BACKGROUND

This invention relates generally to projection display systems, such as may be used in color televisions, business projectors, and computer displays, and more particularly to color scrolling systems used in conjunction with a light modulator.

Light pipes are used for homogenizing the output of a lamp in projection display systems to provide uniform illumination to a spatial light modulator(s) ("SLM"), but may be used in other applications where it is desired to expand light from a relatively small source into a larger field of uniform illumination. In color projection display systems, the white light from the lamp is separated into primary colors, red, green, and blue, with each color being modulated, either with separate modulators or with a sequential modulator, to create the color display.

One technique uses a rotating color wheel to sequentially scroll a series of red, green, and blue color filters across the exit face of the light pipe. The sequence of colors is provided to a display in rapid succession so that a human eye perceives a full color image. Unfortunately, as each color filter passes over the exit face of the light pipe, the non-transmitted colors are lost, either absorbed or reflected by the filter. Thus, the light from the light source is not efficiently used.

A further technique recaptures non-transmitted light by using a color wheel with a series of color filters that reflect the light not transmitted through the color filter. The input face of the light pipe is reflective to the wavelengths of interest, except for a clear aperture through which light from the lamp is coupled to the light pipe. Light reflected off the color wheel travels back through the light pipe, reflects off the input face, and travels back to the exit face. This process may occur several times until a different colored filter is present at the exit face, and the re-circulated light is transmitted through this filter. This process is called color recapture or color recycling.

However, this technique, while recapturing some of the light and thus improving efficiency, introduces additional loss mechanisms. First, the aperture can limit the light captured from the lamp, and allows light to be lost back through the aperture during the recapture sequence. If a reflective coating on the input face is not required, than the entire input face can be clear to couple all the incident light falling upon it into the light pipe. Second, the light pipe-air and air-color wheel interfaces can both introduce reflective losses. Third, if the color wheel is not flat when the light is reflected back into the light pipe, a portion of the light might exit the light pipe because of the change in the angle of incidence violates total internal reflection ("TIR"). Other losses, such as absorptive and scattering losses, can also occur. More importantly, if the color wheel is not flat, i.e. the distance between the color wheel and the light pipe changes during a revolution, the amount of light coupled back into the rod varies, leading to intensity variations at the spatial light modulator.

Therefore, it is desirable to provide color recapture systems without the aforementioned problems arising in systems employing color wheels.

SUMMARY OF THE INVENTION

A scrolling color system includes a color-separating light integrator and scrolling beam diverter. The color-separating light integrator could be a light pipe with two or more dichroic filters on the exit face, for example. Broad-spectrum light entering the light integrator is separated into light beams having selected color. The non-selected light from each filter is reflected back into the integrator for homogenization, thus efficiently using the light from the light source.

In another embodiment of the present invention, a color-separating recirculating light integrator also includes polarization recovery and recirculation. In yet another embodiment, a recirculating light integrator compensates for spatial brightness distribution at the light valve or display screen.

DETAILED DESCRIPTION OF THE INVENTION

I. Introduction

Single-panel projection display systems can provide improved image quality and reduced cost compared to conventional 3-panel systems. Conventional absorptive color filter techniques can be inefficient in using the light since the absorbed light is typically unavailable to illuminate the display screen. One embodiment of the present invention provides a method and apparatus for scrolling color displays that improves efficiency by providing all colors to a light valve at all times and by re-circulating light in an integrating light pipe. Other embodiments can use multiple light valves.

The light integrator spatially separates stripes of light. A rotating prism, rotating mirror drum, or other light beam diverter directs the moving color beams to the light valve. The stripes of modulated light scroll down the display, typically from top to bottom. As one color scrolls off the bottom of the panel, it appears again at the top. In this manner, fill spectral efficiency is maintained. The creation of the color bands is combined with light homogenization in a light integrator and scrolling motion is achieved with a single moving optical element.

II. Exemplary Light Integrators

Figure 1A:
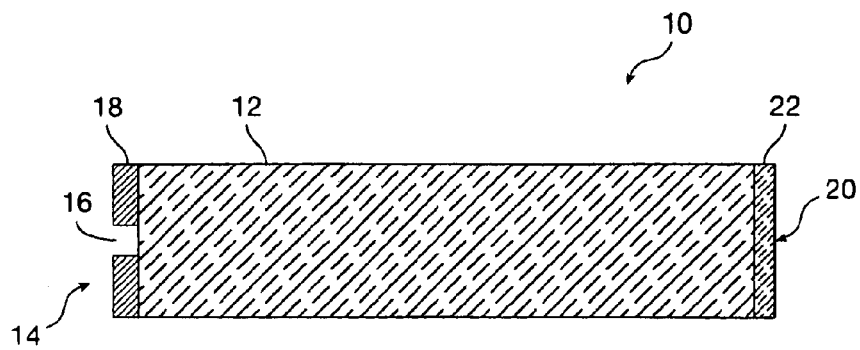
FIG. 1A is simplified cross section of a light pipe assembly according to an embodiment of the present invention

FIG. 1A is a simplified cross section of a light pipe assembly 10 according to an embodiment of the present invention. The light pipe assembly includes a rod 12 made of a transparent material, such as optical glass or plastic. One type of optical glass that can be used for the light pipe is commonly known as BK-7™. Other types of integrators can be used, such as "light tunnels", which can be a rectangular tube made with inward-reflecting mirrors, for example. For simplicity of discussion, the term "light pipe" includes integrator rods, integrating hollow light tunnels, and similar optical structures.

The input face 14 of the light pipe has an aperture 16 that couples light from a lamp into the light pipe and a reflector 18 generally over a remaining portion of the input face. The reflector could be a stack of dielectric thin films or a metal film, for example.

The aperture is kept as small as possible, typically less than one-third the area of the input face, to achieve efficient retroreflection of the recirculating light, while allowing efficient coupling of the light from the lamp through the aperture into the light pipe. The light from the lamp is focused (converged) onto the aperture and coupled into the light pipe. Thus the size of the aperture depends somewhat on the arc length of the lamp and the optics used to focus the light into the aperture.

The exit face 20 of the light pipe assembly includes a color filter 22. Other color filters are present on the exit face, but are not shown in this section. The color filter transmits light of selected wavelengths, such as a band of the visible light spectrum, and reflects other wavelengths. Some of the light, either selected or non-selected, is typically lost to absorption, scattering, and other loss mechanisms.

Figure 1B:
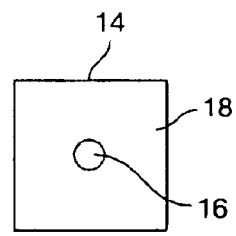
FIG. 1B is a simplified end view of the input face of the light pipe assembly of FIG. 1A.

FIG. 1B is an end view of the input face 14 showing the aperture 16 and the reflector 18. The aperture is nominally centered, but this is not required. Similarly, it is not required that the aperture be round. The light pipe is illustrated as generally square, and in many embodiments is rectangular or other shape. Generally, the cross section of the light pipe matches, or at least shares the aspect ratio, of the subsequent light modulator (light valve). Although the light pipe is illustrated as having opposing sides parallel to each other, the light pipe could be tapered. Similarly, the light pipe could be curved.

Figure 1C:
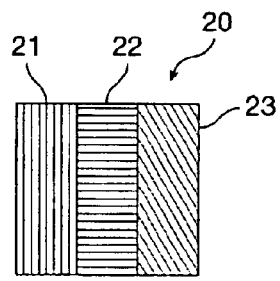
FIG. 1C is a simplified end view of the exit face of the light pipe assembly of FIG. 1A.

FIG. 1C is an end view of the exit face 20 of the light pipe showing three color filters. The filters will be characterized by the color of light each transmits, and in this embodiment include a red filter 21, a blue filter 22, and a green filter 23, which are the primary colors. However, the system does not have to be a 3-color system, nor are the chosen colors restricted to primary colors. For example, a yellow filter could be added to make use of a yellow peak in the spectrum of an illumination source, for example. Alternatively, the exit face could have only two filters, such as yellow and magenta, yellow and cyan, or cyan and magenta, for example.

The filters are dichroic filters that are stacks of dielectric thin films, for example. In some embodiments the filters are formed (deposited) directly on the end of the light pipe. In other embodiments, filters are attached to the end of the light pipe with optical cement (adhesive) or by optical contact bonding. Although the filters are shown as stripes, other shapes and configurations are possible. Similarly, it is not required that each filter have the same area, and in some embodiments it might be desirable increase the area of one or more of the filters for color balancing.

Even if no color shifting occurs in the light pipe, color balancing may be achieved because of the loss mechanisms associated with re-circulating light recapture. When the light is re-circulated, some light will escape out the aperture, and some light will be absorbed as it travels through the light pipe. Reflection loss will also occur at both ends of the light pipe. Therefore it is generally desirable to transmit the desired light through the filters with as little re-circulation as possible. The size, shape and transmission function of the patterned dichroic filters can be selected to provide color correction to either the illumination source or the characteristics of the spatial light modulator, for example where the contrast has a detrimental wavelength dependence associated with the dispersive characteristics of the other optical elements.

The color filters on the exit face of the light pipe are illuminated by the homogenized light from the light pipe. Each color filter transmits selected wavelengths and reflects non-selected wavelengths. The reflected non-selected wavelengths are spatially homogenized as they are re-circulated (reflected back and forth through the light pipe). This homogenized re-circulated light then illuminates the color filters on the exit face, and portions of the re-circulated light now illuminates color filters allowing transmission. Thus some of the originally reflected light is recovered.

The color-separated light from the color filters can be scrolled with a scrolling prism, for example, and synchronized to a modulator, such as a spatial light modulator ("SLM") to produce a full-color display. SLMs can be transmissive or reflective liquid-crystal devices or micromirror arrays, for example. One example of a spatial light modulator is commonly known as a digital light processor ("DLP"™). "Scrolling" means that the color light beams (bands) are moved across a selected area in a continuous and periodic fashion. Therefore, the light beams diverted by a rotating prism are scrolled across the SLM, and the modulated light beams are in turn scrolled across the display screen (typically up or down) to form a full-color image on the display screen.

Figure 2A:
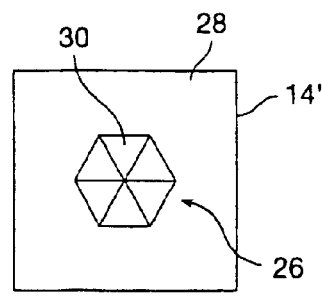
FIG. 2A is a simplified end view of the input end of a light pipe assembly according to another embodiment of the present invention.

FIG. 2A is a simplified end view of the exit end 14' of a light pipe 12' with a faceted center region 26 surrounded by a planar region 28 for use in re-circulating or re-capture light systems, such as a color re-circulating system. The faces 30 of the faceted region form an angle a of about 1–2 degrees with the planar region. The planar region is essentially normal to the optic axis. The facets deflect recirculated light away from the aperture and thereby improve recirculation efficiency. The reflective color filters or other re-circulating element(s) are correspondingly patterned to modify the angular distribution of emitted light such that a greater percentage of exiting light is concentrated towards the center of the illumination cone. The exit face of the light pipe in this embodiment is not re-imaged.

Figure 2B:
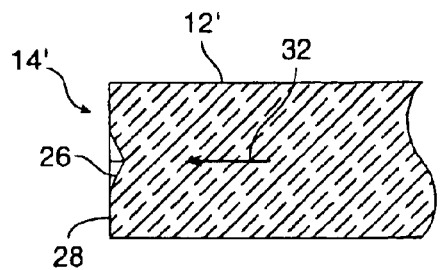
FIG. 2B is a simplified cross section of a portion of the light pipe illustrated in FIG. 2A.

FIG. 2B is a simplified cross section of a portion of the light pipe 12' in accordance with FIG. 2A showing the faceted region 26 surrounded by the planar region 28. Incident light reaching the central region is reflected away from the transmissive aperture at the entrance face, when it exceeds a desired angle of incidence, or is outside the passband wavelength. The slight tilt of the facets promotes reflection of chief rays (shown as an arrow 32) from the reflective coating on the input face, rather than escape through the aperture.

Optionally, the entrance aperture may also provide a filtering function that is similar or complimentary to the function of the filter on the exit face, one providing discrimination by wavelength or another characteristic, while the other discriminating by angle of incidence or another characteristic. For example the filter at the entrance face is a notch filter while the filter(s) in the central facet is a broadband reflector at non-normal incidence.

Figure 3:
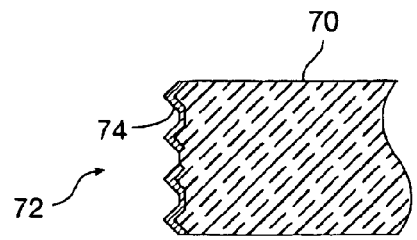
FIG. 3 is a simplified cross section of a portion of a light pipe with a corner cube-type reflector on the input face, according to another embodiment of the present invention.

FIG. 3 is a simplified cross section of a light pipe 70 according to another embodiment of the present invention in which the input face 72 includes a corner cube-type retroreflector 74. The corner cube-type retroreflector reflects incident light at the same angle with respect to the optic axis. This embodiment is preferred when non-normal incidence is desired on the reflector to promote the efficiency of the light modification function provided by the reflector while avoiding the reflection of light at an angle greater than the critical angle for TIR to further minimize the potential for energy losses from the light pipe.

III. A Multi-Functional Recirculating Light Integrator

Figure 4:
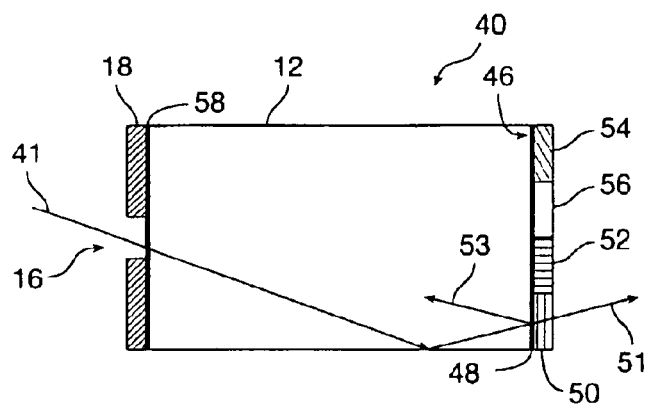
FIG. 4 is a simplified cross section of a multi-functional light recycling system according to an embodiment of the present invention.

FIG. 4 is a simplified cross section of a multi-functional light recycling system 40 according to an embodiment of the present invention. Light 41 is coupled into the light integrator 12 through an input aperture 16. A reflector 18 surrounds the input aperture, which can be a metallic reflector or a dielectric thin film stack, for example. The aperture could be at a corner or edge of the input face, in which case it would not be surrounded by the reflector. The light travels down the integrator, reflecting off the walls (interfaces) and is spatially homogenized. In other words, light from the arc image illuminates the exit end 46 of the light pipe with essentially uniform intensity. A reflective polarizer 48 is placed after the exit end of the light integrator, as are dichroic filters 50, 52, 54. One type of reflective polarizer is commonly called a wire-grid polarizer, such as are sold under the trade name PRoFLUX™ by MOxTEK of Orem, Utah. A clear section 56 may be included to increase the brightness of the eventual image on the display screen, and may be either a piece of clear glass, or an uncoated area. The dichroic filters could be formed on or attached to one side of a common substrate with polarizer structure, or the polarizer and filters could be on separate substrates.

The dichroic filters are generally filters that transmit light of a selected color or colors and reflect light of non-selected colors. For example, the filters could be red 50, green 52, and blue 54, or yellow and magenta filters could be used in a system where red does not scroll, or cyan and magenta in a system where blue does not scroll, for example. The color filters can be placed before or after the reflective polarizer, relative to the exit face 46 of the light integrator. Red light falling on the red filter 50, for example, is transmitted 51 through the filter and the remaining light 53 is reflected back into the light integrator 12. The reflected light is homogenized and reflects off the reflector 18 on the input end, with some of the light being lost out the aperture 16. The remaining light is reflected back toward the color filters, so that a portion of the remaining light originally reflected off the red filter will illuminate the other color filters and clear section, if present, and be transmitted toward the display screen (not shown). The process of back reflection, homogenization and re-illumination repeats to increase the light output of the integrator. This is known as "recycling", "recirculating" or "recapturing" light.

Similarly, the reflective polarizer 48 transmits light having a selected polarization state and reflects light having a non-selected polarization state back into the light integrator 12. The light integrator homogenizes the back-reflected light and some polarization modification occurs from the multiple reflections. An optional retarder plate 58 or phase-shifting coating may be added in the optical path between the input reflector 18 and the reflective polarizer 48. Back-reflected light travels through the retarder plate twice before returning to the reflective polarizer, thus a quarter-wave retarder plate or retarder plate being an odd multiple of a quarter-wave plate is desirable if little polarization shift otherwise occurs in the integrator. The polarization state of a portion, perhaps most, of the back-reflected light is converted to the selected polarization state before it returns to the reflective polarizer 48, where it is transmitted.

In an alternative embodiment, the retarder plate is omitted and the light pipe is made of birefringent glass. The birefringent glass provides modification of the polarization state of the light transmitted through the birefringent glass. In a particular embodiment, the length of the light pipe of birefringent glass is selected to provide about one quarter-wave of retardation at a selected wavelength.

It is estimated that up to 35% of the usable light arriving at the aperture can be provided to the light valve with color and polarization recycling (with no clear section 96 in the color filter plane). In comparison, it is estimated that only about 16% of the light would be available if an absorptive polarizing filter and absorptive color filters were used (i.e. without light recycling).

IV. A Brightness-Equalizing Light Integrator

Figure 5A:
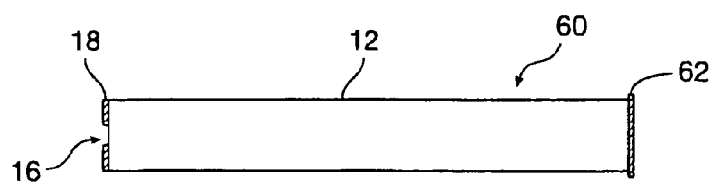
FIG. 5A is a simplified side view of a brightness equalizing light recycling system according to an embodiment of the present invention.

FIG. 5A is a simplified side view of a brightness equalizing light recycling system 60 according to an embodiment of the present invention. A light integrator 12 has an aperture 16 and reflector 18 at its input end, and a spatially variable reflective transmitter 62 at its exit end. Although the integrator provides homogeneous illumination of the light valve, the brightness of the screen typically decreases from the center of the screen to its edge. This is due to the limitations of typical optical systems and the imaging of the light valve or micro-display onto a flat screen. A more uniform brightness on the display screen can be achieved by illuminating the light valve with a non-uniform intensity distribution, i.e. darkening the center relative to the edges.

The spatially variable reflective transmitter provides relatively more shading in the center of the exit face of the light pipe than at its edges. Unlike a simple absorptive filter that removes light from the center portion of the field, the reflective transmitter recycles this light that would otherwise be lost back into the integrator. Thus the center is darkened relative to the edge(s) without losing as much light. This provides a brighter display, or allows other design choices to be made, such as selecting a lamp having lower power requirements or longer lifetime, for example.

Figure 5B:
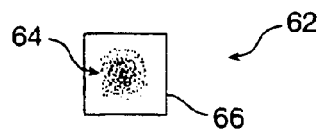
FIG. 5B is a simplified end view of a brightness equalizing element according to an embodiment of the present invention.

FIG. 5B is a simplified end view of a brightness equalizing element 62 according to an embodiment of the present invention. A spatially variable reflective filter 64 is formed on a glass substrate 66, or could be formed directly on a light pipe, or on a dichroic filter plate, or a polarizer, or even on a retarder plate placed between the polarizer and the light pipe, for example. The filters could be formed from very small dots of metal, for example, that reflect essentially all light falling on the dot back into the light pipe. The pattern could be created by coating a mirror (metallic or dielectric) and using photolighography techniques to define a dot pattern. The dots could be opaque, or partially transmissive. In a particular embodiment, the spatial light distribution of light exiting the light pipe follows $1-\cos^2(r)$, where r is the radius from the center of the pipe or display screen. This helps compensate for the change in screen brightness that can occur in display systems.

The order of light recycling elements included in a light recycling system, such as a spatially variable filter, reflective polarizer, and dichroic filters may be chosen according to desired light characteristics.

V. Scrolling Color Systems

Figure 6A:
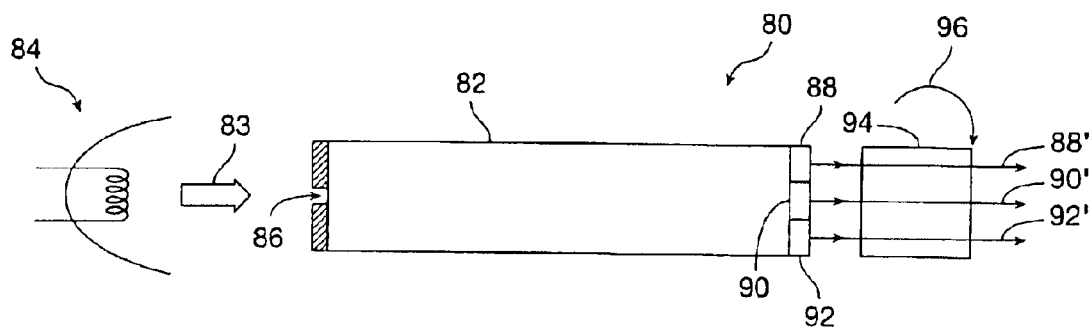
FIG. 6A is a simplified top view of a portion of a scrolling color system with a rotating prism and scrolling color light beams according to an embodiment of the present invention.

FIG. 6A is a simplified top view of a portion of a color scrolling system 80 with a rotating prism according to an embodiment of the present invention. An integrating 3-color light pipe 82 receives essentially white light 83 from a light source 84, such as a lamp, through the aperture 86. The integrating light pipe includes three color filters, which in this example are designated blue 88, green 90, and red 92. Each filter transmits the indicated color (thus forming a color "beam") and reflects the remaining light back into the integrating light pipe, with some losses.

The color beams 88', 90', and 92' illuminate an optical scrolling element 94, which in this case is a square prism that rotates in the direction of the arrow 96. When the rotating prism 94 is in the position illustrated in FIG. 6A, the color beams pass through the prism with relatively little refraction. Although the color beams are illustrated with a simple line, the color beams have a width roughly in proportion to the width of the associated filter. Thus, the "beam" diverted by the rotating prism is essentially a band of color-selected light. Color wheels with spiral color filters produce curved color bands, which adds significant complexity to the display driver electronics. Scrolling color systems in accordance with embodiments of the present invention can provide straight line borders between color bands. Additionally, there is no étendue penalty, as with some conventional color scrolling systems.

Of course, the other direction of rotation could be chosen and the color filters could be different colors, be in a different order on the end of the light pipe, or could include additional or fewer color filters. Similarly, the scrolling element does not have to be a square prism, but could be hexagonal, octagonal, etc., or could be a mirror drum, or a mirror that moves in a sawtooth motion, as is achievable with galvanomirrors. In some embodiments, the scrolling distance and/or scrolling transverse might be smaller than with a rotating four-sided prism. The color pattern might then consist of multiple sets of color bands, with appropriate modification of the color valve and synchronization.

Figure 6B:
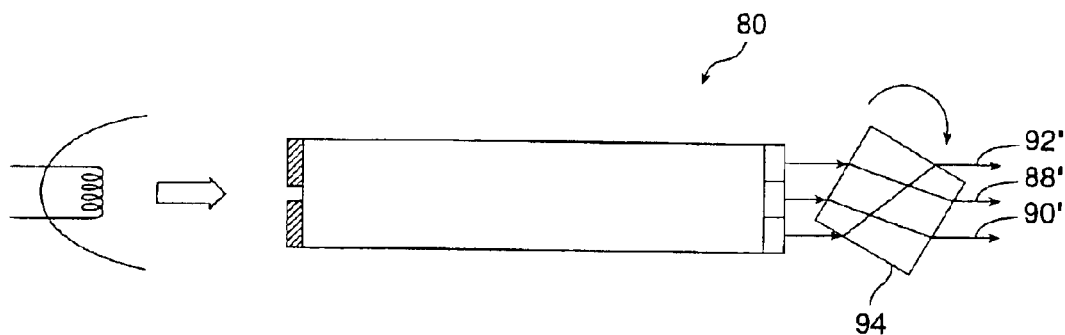
FIG. 6B is a simplified top view of the scrolling color system illustrated in FIG. 2A with the rotating prism in a second position.
Figure 6C:
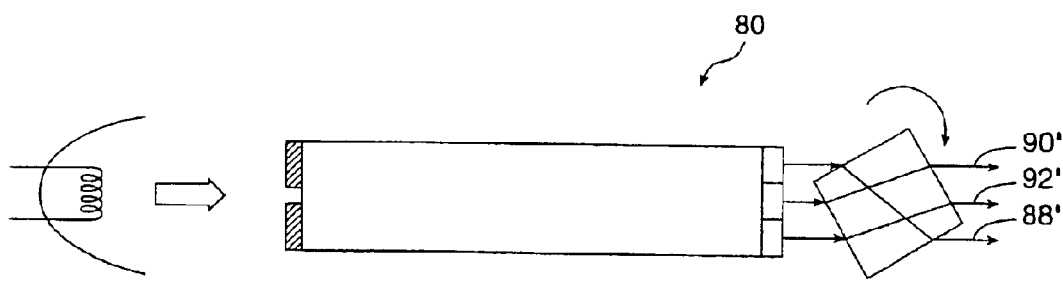
FIG. 6C is a simplified top view of the scrolling color system illustrated in FIGS. 2A and 2B with the rotating prism in a third position.

FIG. 6B is a simplified top view of the rotating prism 94 illustrated in FIG. 2A in a second position. In this position the prism has rotated from the orientation shown in FIG. 2A and the color beams are refracted to different positions. The blue 88' and green 90' beams have scrolled down, and the red beam 92' is refracted to the top of the scrolling order. In FIG. 6C, the red 92' and blue 88' beams have scrolled down and the green beam 90' is refracted to the top of the scrolling order. As the prism continues rotating, the next face 98 will become essentially perpendicular to the light beams, and the light beams will scroll back to the order shown in FIG. 6A. The faces of the prism are typically coated with an antireflective ("AR") coating.

Other beam deflectors could be used, such as a rotating mirror drum. A mirror drum could have a number of mirrored faces around the periphery of the drum, typically about 4–12 sides. It is not necessary that the mirror drum have an even number of faces. Frontside mirrors may be used to avoid secondary reflections off the glass of backside mirrors, but backside mirrors may also be used, particularly with anti-reflective coatings. The mirrors may be metallic mirrors, such as aluminum or silver mirrors, or the mirrors may be stacks of thin-film layers, such as alternating layers of dielectric materials. Such dielectric reflectors may be attached to the mirror drum, or directly deposited onto the mirror drum, for example. Similarly, a reflective metallic thin film layer could be deposited on a mirror drum substrate made of optically faceted glass or cast polymer, for example, to provide front surface mirrors on the facets.

Rather than refracting the light beams, as through the prism, the light beams are reflected off a face of the mirror drum in a selected direction. The color light beams scroll across the light valve. The light integrator is typically placed at an oblique angle, i.e. so that the light beams would not pass through the rotational axis of the mirror drum. The number of faces may be chosen according to the desired traverse and scrolling period of the light beams.

Similarly, a reflective or refractive element could be moved in a sawtooth pattern to divert the light. An prism, optic wedge, mirror, or other device could be combined with an electro- or galvano-actuator and cycled in a linear fashion to achieve the desired scrolling of the color beams from the light integrator. In these embodiments the scrolling distances is likely to be smaller than with a rotating prism. The color pattern could consist of multiple blue-green-red stripes that are scanned over smaller areas of the light valve.

Figure 7A:
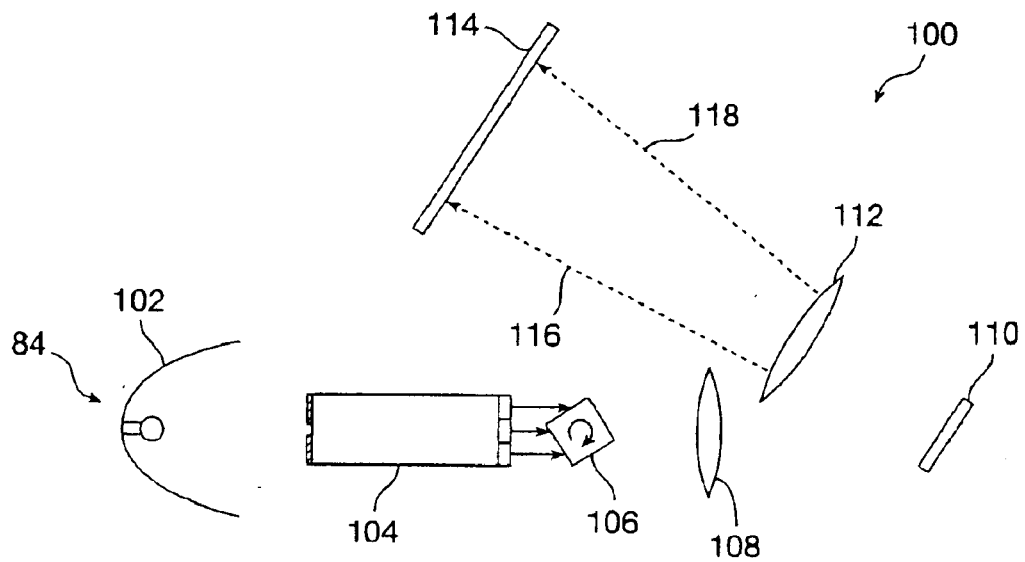
FIG. 7A is a simplified schematic representation of a single light valve 3-color projection system according to an embodiment of the present invention.

FIG. 7A is a simplified schematic representation of a portion of a single light valve 3-color projection system 100 according to an embodiment of the present invention. A lamp 84 with a focusing reflector 102 provides a broad spectrum of light to an integrating color recirculator 104, such as the light pipe described above in reference to FIGS. 1A-1C, with blue, green, and red color filters on its exit face. A beam diverter 106, such as the rotating prism described above in reference to FIGS. 6A-6C scrolls the color-separated light beams exiting the light pipe to a lens 108 that collimates and focuses the beams onto a SLM 110. A digital micro-mirror-type device does not require polarized light, as do some other types of light modulators, and birefringence in the optical path is not critical. The modulated light from the SLM is collected and focused by a projection lens 112 to a screen 114, as represented by the dashed lines 116, 118. The color bands are scrolled so quickly as to give the viewer an appearance of simultaneous full color. Typically, the SLM is synchronized with the scrolling color bands to provide a color image on the screen. The associated electronics and mechanics are not shown, and lenses and other components are highly simplified for purposes of illustration. All three colors are present at the SLM, and hence at the screen, at all times. The combination of the integrating recirculating light pipe and scrolling mechanism provides efficient use of the light provided by the light source. This in turn provides a brighter display for a given light source (lamp), or allows the use of a lower-powered light source to achieve the same brightness as conventional scrolling color projection systems.

Figure 7B:
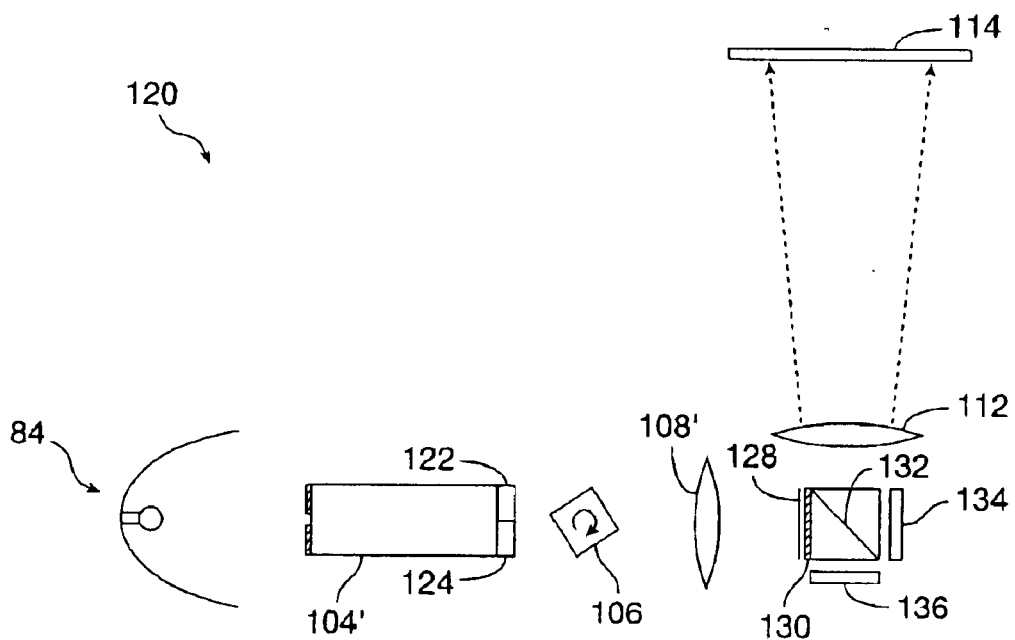
FIG. 7B is a simplified schematic representation of a double light valve projection color system according to another embodiment of the present invention.

FIG. 7B is a simplified schematic representation of a portion of a double light valve projection color system 120 according to another embodiment of the present invention. The lamp 84 provides broad-spectrum light to a light pipe 104' with two color filters 122, 124 on the exit face. The color filters could be yellow and magenta, for example. In that case, the color red would be transmitted out of the entire face of the light pipe, while green and blue color beams would be transmitted out of the yellow and magenta filters. The choice of colors is only exemplary, and other color filter combinations, such as yellow and cyan or cyan and magenta could be chosen. The preference for which color pair to choose might depend on the "bottleneck" color, i.e. which color is weakest. For example, if red is the bottleneck color, than it might be desirable to use a yellow filter and a magenta filter, so that red is always "on". This is advantageous in that it avoids recycling loss of the bottleneck color, and promotes color balance. It is not necessary to limit the filter colors to the primary colors or their compliments.

Thus, the rotating prism 106 scrolls the blue and green color beams, while the red beam is essentially constant. The lens 108' focuses the scrolling and non-scrolling beams on an assembly that includes a polarizer 128, color filter 130, and polarizing beam splitter 132. The non-scrolling red light is split from the scrolling blue and green light and illuminates a light valve (red light valve) 134, while the blue and green light bands are scrolled across a second light valve (blue/green light valve) 136. Thus, all colors are present at all times, making efficient use of the light from the source. The light valves could be reflecting liquid crystal devices, for example, or micromirror arrays. Transmissive light valves could be used with appropriate optics.

VI. Exemplary Methods

Figure 8A:
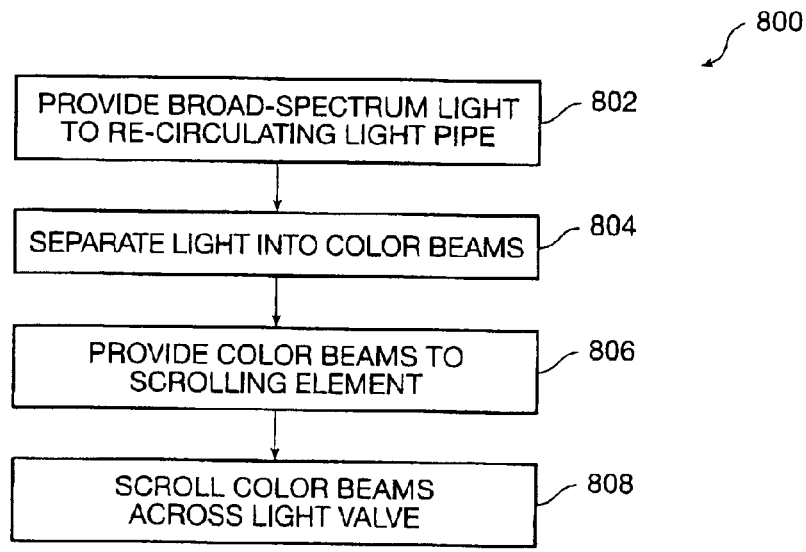
FIG. 8A is a simplified flow chart of a method of scrolling color according to an embodiment of the present invention.

FIG. 8A is a simplified flow diagram of a method of scrolling color 800 according to an embodiment of the present invention. Broad-spectrum light, such as from a halogen lamp, is provided to an integrating color separator (step 802), such as a light pipe having an aperture in an otherwise reflective input end and an output end with a plurality of color filters. The broad-spectrum light is separated into color beams (step 804) and the color beams are provided to a scrolling element (step 806), such as the rotating prism illustrated in FIGS. 5A-5C. The scrolling element directs the color beams to scroll across a light valve (step 808). The filters could be fixed to the end of the light pipe or mounted between the output end of the light pipe and the scrolling element, for example, but generally do not move in relation to the end of the light pipe.

Figure 8B:
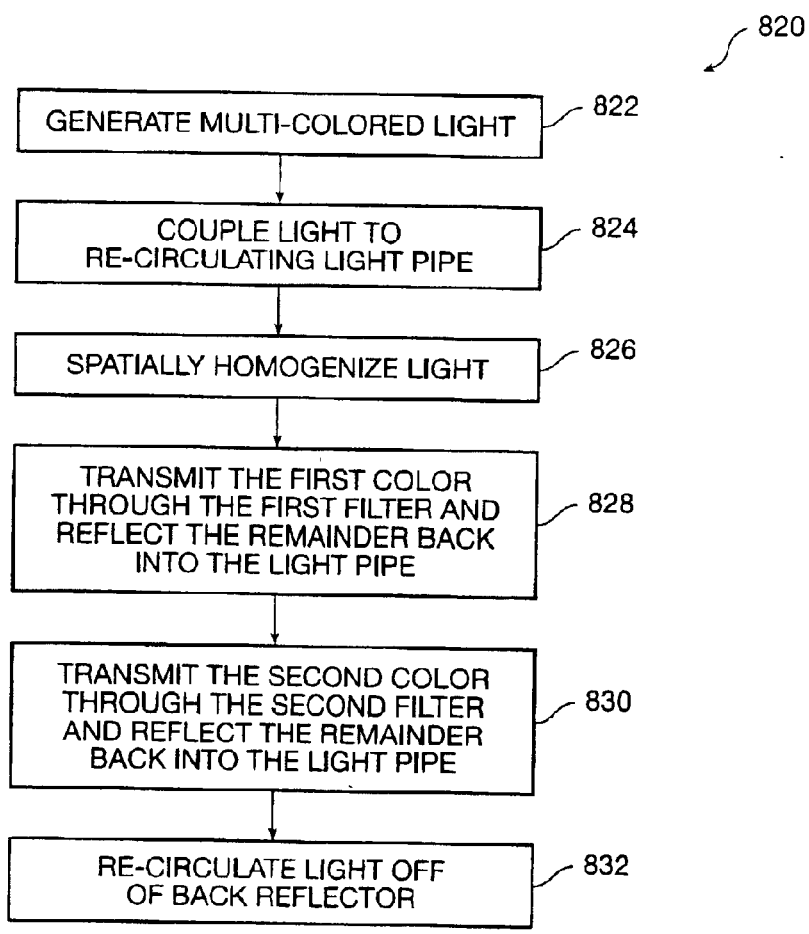
FIG. 8B is a simplified flow chart of a method of recapturing color in a light integrator according to an embodiment of the present invention.

FIG. 8B is a simplified block diagram of a method of recapturing color in a light integrator 820 according to an embodiment of the present invention. Light having at least a first color and a second color is generated by a light source (step 822) and coupled to a light pipe (step 824) having an input end including a reflector over a portion of the input end. The light is spatially homogenized (step 826) in the light pipe and provided to an exit face that has at least two color filters disposed on the exit face. The first color of light is transmitted through the first color filter and the second color(s) of light is reflected off the first filter back into the light pipe (step 828). The second color of light is transmitted through the second color filter, which reflects at least the first color of light back into the light pipe (step 830). The light reflected off the color filters back into the light pipe is reflected off the reflector on the input end (step 832) and homogenized so that at least a portion of the re-circulated light is transmitted through the color filters. The remaining portion is again re-circulated, minus losses for absorption, scattering, and back transmission through the aperture in the input end of the light pipe.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

We claim:

1. A color scrolling system comprising:
    a re-circulating light integrator having an exit face including
        a first color-selective filter affixed to the re-circulating light integrator providing a first color light beam and
        a second color-selective filter affixed to the re-circulating light integrator providing a second color light beam; and
    a light beam diverter configured to scroll the first color light bean and the second color light beam, wherein the first color-selective filter is a yellow filter and the second color-selective filter is a magenta filter.

2. The color scrolling system of claim 1 wherein the light integrator comprises a rod and the first color-selective filter and the second color-selective filter are affixed to the exit face of the rod without an intervening gap.

3. The color scrolling system of claim 1 wherein the re-circulating light integrator comprises a transparent rod.

4. The color scrolling system of claim 1 wherein the re-circulating light integrator comprises a hollow light tunnel.

5. The color scrolling system of claim 1 wherein the light beam diverter comprises a rotating prism.

6. The color scrolling system of claim 1 wherein the light beam diverter comprises a rotating mirror drum.

7. The color scrolling system of claim 1 wherein the light beam diverter comprises a linear actuator coupled to an optical element and configured to move the optical element in an oscillating fashion.

8. The color scrolling system of claim 1 further comprising a clear section of the exit face.

9. A color scrolling system comprising:
    a re-circulating light integrator having an exit face including
        a first color-selective filter affixed to the re-circulating light integrator providing a first color light beam and a second color-selective filter affixed to the re-circulating light integrator providing a second color light beam; and a light beam diverter configured to scroll the first color light beam and the second color light beam, wherein the first color-selective filter is a magenta filter and the second color-selective filter is a cyan filter.

10. A color scrolling system comprising:

a re-circulating integrating light rod having an input face configured to receive broad-spectrum light from a light source and an output face having a plurality of color filters affixed thereto and providing an associated plurality of color-selective light beams;

a rotating optical scrolling element configured to scroll at least two of the plurality of color-selective light beams across at least a portion of a light valve, wherein the plurality of color filters includes at least one filter selected from the group consisting of a yellow filter, a magenta filter, and a cyan filter.

11. The color scrolling system of claim 10 wherein the light valve comprises a spatial light modulator.

12. The color scrolling system of claim 11 wherein the spatial light modulator includes a micromirror array.

13. The color scrolling system of claim 11 wherein the spatial light modulator comprises a transmissive light valve.

14. The color scrolling system of claim 11 wherein the spatial light modulator comprises a reflective liquid crystal device.

15. The color scrolling system of claim 10 further comprising a clear section of the output face providing a non-color-selected light beam.

16. A light pipe comprising:

an input face having
a planar region and
a faceted region, the faceted region including a plurality of faces, each of the plurality of faces forming an angle between about 1–2 degrees with the planar region.

17. The light pipe of claim 16 wherein the faceted region is substantially at a center of the input face and is surrounded by the planar region, the planar region being essentially normal to an optic axis of the light pipe.

18. A recycling light integrator comprising:

a light integrator having an input face and an exit face, the input face including
an aperture and
a reflector; and a reflective spatially variable transmitter disposed at the exit face having a non-uniform pattern that is darker in a center region than in an edge region.

19. A recycling light integrator comprising:

a light integrator having an input face and an exit face, the input face including
an aperture and
a reflector; and a reflective spatially variable transmitter having a non-uniform pattern of metallic dots disposed at the exit face.

20. A light recycling device comprising:

a light integrator having an input face and an exit face, the input face including
an aperture and
a reflector configured to reflect light from the input face back into the light integrator;

a reflective polarizer optically coupled to the exit face and configured to transmit light having a selected polarization state and to reflect light having a non-selected polarization state back into the light integrator; and at least one dichroic filter optically coupled to the exit face and configured to transmit a first color of light and to reflect a second color of light back into the light integrator.

21. The light recycling device of claim 20 further comprising a polarization modification element disposed between the reflective polarizer and the reflector.

22. The light recycling device of claim 21 wherein the polarization modification element is a quarter-wave retarder plate.

23. The light recycling device of claim 20 wherein the light integrator comprises a light pipe.

24. The light recycling device of claim 20 wherein the reflective polarizer is disposed between the light integrator and the dichroic filter.

25. The light recycling device of claim 20 further comprising a clear section of the exit face.

26. The Light recycling device of claim 20 further including a spatially variable transmitter configured to transmit a first portion of light and to reflect a second portion of light back toward the light integrator.

27. A light recycling device comprising:

a light integrator having an input face and an exit face, the input face including
an aperture and
a reflector configured to reflect light from the input face back into the light integrator;

a reflective polarizer optically coupled to the exit face and configured to transmit light having a selected polarization state and to reflect light having a non-selected polarization state back into the light integrator; and at least one dichroic filter optically coupled to the exit face and configured to transmit a first color of light and to reflect a second color of light back into the light integrator, wherein the light integrator is a light pipe comprised of birefringent glass.

28. A light recycling device comprising:

a light integrator having an input face and an exit face, the input face including
an aperture and
a reflector configured to reflect light from the input face back into the light integrator;

a reflective polarizer optically coupled to the exit face and configured to transmit light having a selected polarization state and to reflect light having a non-selected polarization state back into the light integrator;

at least one dichroic filter optically coupled to the exit face and configured to transmit a first color of light and to reflect a second color of light back into the light integrator; and a polarization modification element disposed between the reflective polarizer and the reflector, wherein the light pipe has a length selected to provide one-quarter wavelength retardation of light traveling from the exit face to the input face and one-quarter wavelength retardation of light traveling from the input face to the exit face.

* * * * *